United States Patent
He et al.

(10) Patent No.: US 11,784,349 B2
(45) Date of Patent: Oct. 10, 2023

(54) LITHIUM METAL BATTERY ELECTROLYTES AND ELECTROCHEMICAL CELLS INCLUDING THE SAME

(71) Applicant: GM GLOBAL TECHNOLOGY OPERATIONS LLC, Detroit, MI (US)

(72) Inventors: Meinan He, Sterling Heights, MI (US); Mei Cai, Bloomfield Hills, MI (US); Shuru Chen, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 120 days.

(21) Appl. No.: 17/220,058

(22) Filed: Apr. 1, 2021

(65) Prior Publication Data

US 2022/0320584 A1    Oct. 6, 2022

(51) Int. Cl.

| | |
|---|---|
| H01M 10/00 | (2006.01) |
| H01M 10/0568 | (2010.01) |
| H01M 10/0525 | (2010.01) |
| H01M 10/0569 | (2010.01) |
| H01M 10/0567 | (2010.01) |
| H01M 4/38 | (2006.01) |
| H01M 4/485 | (2010.01) |

(Continued)

(52) U.S. Cl.
CPC ....... *H01M 10/0568* (2013.01); *H01M 4/382* (2013.01); *H01M 4/485* (2013.01); *H01M 4/505* (2013.01); *H01M 4/525* (2013.01); *H01M 10/0525* (2013.01); *H01M 10/0567* (2013.01); *H01M 10/0569* (2013.01); *H01M 2004/021* (2013.01); *H01M 2004/027* (2013.01); *H01M 2004/028* (2013.01); *H01M 2300/0034* (2013.01)

(58) Field of Classification Search
CPC ...... H01M 4/525; H01M 4/505; H01M 4/587; H01M 2300/0034; H01M 2004/028; H01M 2004/027; H01M 2300/004; H01M 10/0568; H01M 10/0569; H01M 4/38; H01M 10/052
See application file for complete search history.

(56) References Cited

U.S. PATENT DOCUMENTS

| | | |
|---|---|---|
| 8,974,946 B2 | 3/2015 | Cai et al. |
| 9,160,036 B2 | 10/2015 | Yang et al. |

(Continued)

FOREIGN PATENT DOCUMENTS

| | | |
|---|---|---|
| CN | 115207463 A | 10/2022 |
| DE | 102022105097 A1 | 10/2022 |

OTHER PUBLICATIONS

Meinan He et al., "Lithium Ion Battery Electrolytes and Electrochemical Cells Including the Same", U.S. Appl. No. 17/173,708, filed Feb. 11, 2021.

*Primary Examiner* — Cynthia H Kelly
*Assistant Examiner* — Monique M Wills
(74) *Attorney, Agent, or Firm* — Harness, Dickey & Pierce, P.L.C.

(57) ABSTRACT

An electrolyte for a lithium metal battery including a nonaqueous aprotic organic solvent and a lithium salt dissolved or ionized in the nonaqueous aprotic organic solvent. The nonaqueous aprotic organic solvent includes a cyclic carbonate, an acyclic carbonate, and an acyclic fluorinated ether. The lithium salt includes an aliphatic fluorinated disulfonimide lithium salt.

18 Claims, 1 Drawing Sheet

(51) Int. Cl.
  *H01M 4/505* (2010.01)
  *H01M 4/525* (2010.01)
  *H01M 4/02* (2006.01)

(56) References Cited

U.S. PATENT DOCUMENTS

| | | | |
|---|---|---|---|
| 9,252,411 B2 | 2/2016 | Abd Elhamid et al. |
| 9,373,829 B2 | 6/2016 | Xiao et al. |
| 9,647,254 B2 | 5/2017 | Dadheech et al. |
| 9,742,028 B2 | 8/2017 | Zhou et al. |
| 9,923,189 B2 | 3/2018 | Xiao |
| 9,929,435 B2 | 3/2018 | Cai et al. |
| 9,979,008 B2 | 5/2018 | Dai et al. |
| 10,084,204 B2 | 9/2018 | Dai et al. |
| 10,128,481 B2 | 11/2018 | Xiao et al. |
| 10,141,559 B2 | 11/2018 | Xiao et al. |
| 10,199,643 B2 | 2/2019 | Zhou et al. |
| 10,224,571 B2 | 3/2019 | Yang et al. |
| 10,312,501 B2 | 6/2019 | Yang et al. |
| 10,326,166 B2 | 6/2019 | Yang et al. |
| 10,347,943 B2 | 7/2019 | Zhang et al. |
| 10,367,201 B2 | 7/2019 | Yang et al. |
| 10,396,360 B2 | 8/2019 | Xiao et al. |
| 10,431,849 B2 | 10/2019 | Yersak et al. |
| 10,446,884 B2 | 10/2019 | Yang et al. |
| 10,483,592 B2 | 11/2019 | Xiao et al. |
| 10,497,927 B2 | 12/2019 | Xiao |
| 10,511,049 B2 | 12/2019 | Yang et al. |
| 10,566,652 B2 | 2/2020 | Dai et al. |
| 10,573,879 B2 | 2/2020 | Yang et al. |
| 10,593,931 B2 | 3/2020 | Adair et al. |
| 10,608,249 B2 | 3/2020 | Liu et al. |
| 10,629,941 B2 | 4/2020 | Dai et al. |
| 10,629,949 B2 | 4/2020 | Yersak et al. |
| 10,734,673 B2 | 8/2020 | Yersak et al. |
| 10,991,946 B2 | 4/2021 | Xiao et al. |
| 11,101,501 B2 | 8/2021 | Liu et al. |
| 11,183,714 B2 | 11/2021 | Yang et al. |
| 2013/0330609 A1* | 12/2013 | Sawa ............... H01M 10/0525 429/188 |
| 2015/0056387 A1 | 2/2015 | Dadheech et al. |
| 2015/0056493 A1 | 2/2015 | Dadheech et al. |
| 2015/0349307 A1 | 12/2015 | Dadheech et al. |
| 2016/0172706 A1 | 6/2016 | Xiao et al. |
| 2016/0172710 A1 | 6/2016 | Liu et al. |
| 2017/0271678 A1 | 9/2017 | Yang et al. |
| 2018/0076485 A1* | 3/2018 | Zhang ............... H01M 10/0568 |
| 2020/0328475 A1 | 10/2020 | Hakari et al. |
| 2020/0335825 A1* | 10/2020 | Hancock .......... H01M 10/0569 |
| 2022/0093972 A1* | 3/2022 | Hakari ............. H01M 10/0569 |
| 2022/0255132 A1 | 8/2022 | He et al. |

\* cited by examiner

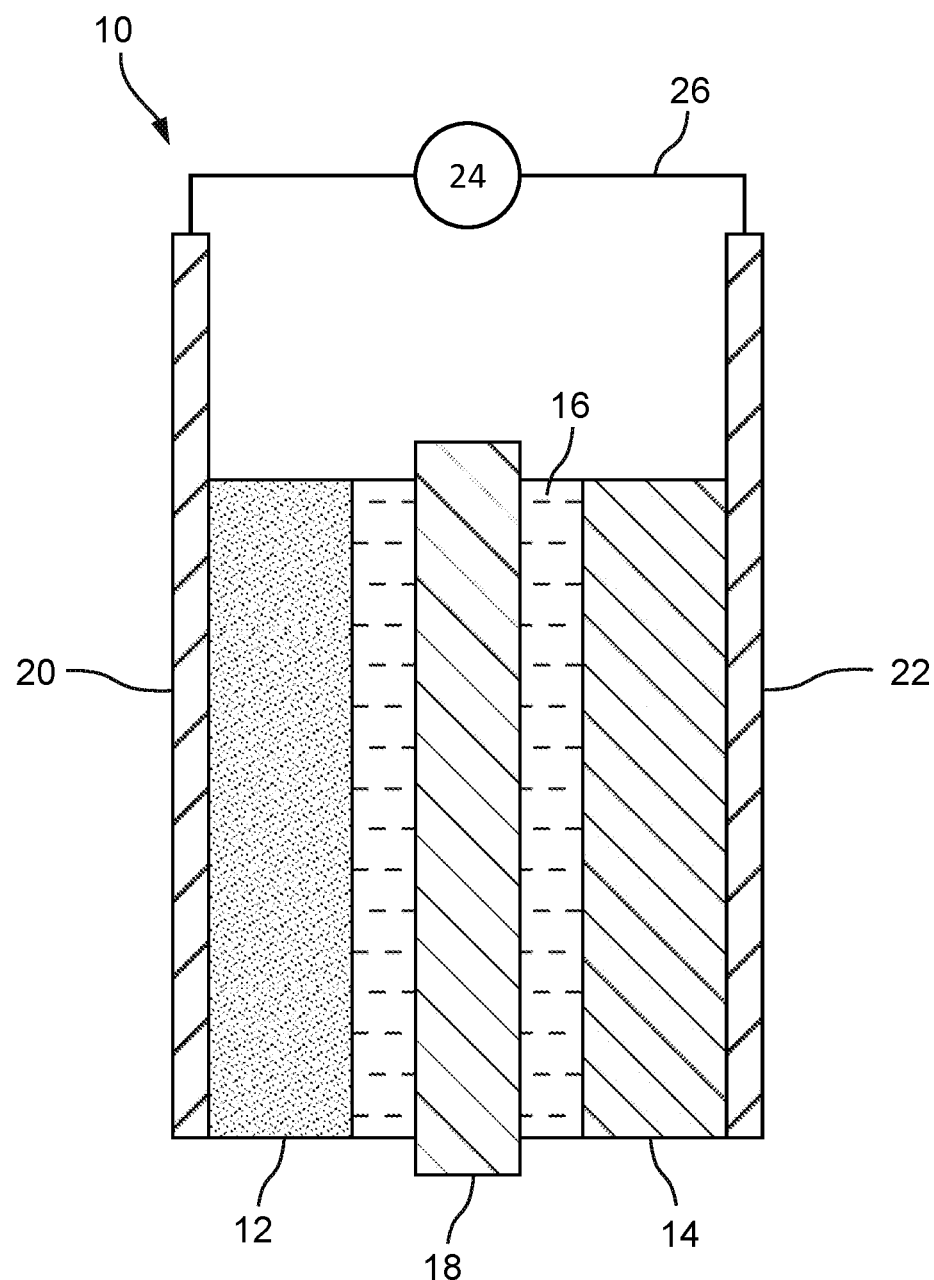

LITHIUM METAL BATTERY ELECTROLYTES AND ELECTROCHEMICAL CELLS INCLUDING THE SAME

INTRODUCTION

The present disclosure relates to lithium metal batteries and, more particularly, to nonaqueous, aprotic liquid electrolytes for lithium metal batteries.

Electrochemical cells of secondary lithium batteries generally include a negative electrode and a positive electrode spaced apart from one another by a porous separator. The negative and positive electrodes and the porous separator are infiltrated with an ionically conductive electrolyte that provides a medium for the conduction of lithium ions between the negative and positive electrodes during discharge and recharge of the electrochemical cell. Electrolytes of lithium batteries generally comprise a lithium salt dissolved or dispersed in one or more aprotic organic solvents and may be formulated to exhibit certain desirable properties over a wide operating temperature range. Such desirable properties may include high ionic conductivity, high dielectric constant (correlated with a higher ability to dissolve salts), low viscosity, adequate coordination behavior between the organic solvent and lithium salts, and chemical compatibility with the other components of the electrochemical cell.

SUMMARY

An electrolyte for a lithium metal battery is disclosed. The electrolyte includes a nonaqueous aprotic organic solvent and a lithium salt dissolved or ionized in the nonaqueous aprotic organic solvent. The nonaqueous aprotic organic solvent includes a cyclic carbonate, an acyclic carbonate, and an acyclic fluorinated ether. The acyclic fluorinated ether has the formula:

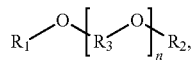

wherein n=0 or 1, wherein $R_1$ and $R_2$ are each straight-chain C1-C6 fluoroalkyl groups, and wherein, when n=1, $R_3$ is a methylene group or a polyethylene group. The lithium salt includes an aliphatic fluorinated disulfonimide lithium salt having the formula:

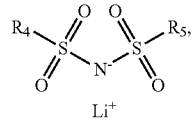

wherein $R_4$ and $R_5$ are individually either a fluorine (F) atom or a straight-chain C1-C6 fluoroalkyl group.

The total number of carbon atoms in the acyclic fluorinated ether may be 2, 3, 4, 5, 6, or 7.

In the acyclic fluorinated ether, n may be equal to zero. In such case, $R_1$ may be a perfluoromethyl group or a perfluoroethyl group and $R_2$ may be a perfluoromethyl group or a perfluoroethyl group.

In the acyclic fluorinated ether, n may be equal to one. In such case, $R_1$ and $R_2$ may be perfluoroethyl groups and $R_3$ may be an ethylene group.

The acyclic fluorinated ether may be at least one of bis(2,2,2-trifluoroethyl) ether, 2,2,3,3-tetrafluoro-1-(1,1,2,2-tetrafluoroethoxy)propane, 1,1,2,2-tetrafluoroethyl 2,2,2-trifluoroethyl ether, 1-(2,2-difluoroethoxy)-1,1,2,2-tetrafluoroethane, 1,1,2,2-tetrafluoro-1-(2,2,2-trifluoroethoxy)ethane, or 1,2-bis(1,1,2,2-tetrafluoroethoxy)ethane.

The cyclic carbonate may be at least one of ethylene carbonate, fluoroethylene carbonate, difluoro ethylene carbonate, or 3,3,3-trifluoropropylene carbonate.

The acyclic carbonate may be at least one of diethyl carbonate, dimethyl carbonate, or ethyl methyl carbonate.

The aliphatic fluorinated disulfonimide lithium salt may be at least one of lithium bis(fluorosulfonyl)imide, lithium bis(trifluoromethanesulfonyl)imide, or lithium (fluorosulfonyl)(trifluoromethanesulfonyl)imide.

The aliphatic fluorinated disulfonimide lithium salt may be present in the nonaqueous aprotic organic solvent at a concentration in a range of from 0.1 M to 1.0 M.

The electrolyte may further include a second lithium salt dissolved or ionized in the nonaqueous aprotic organic solvent. The second lithium salt may include at least one of $LiClO_4$, $LiBF_4$, or $LiPF_6$.

In combination, the aliphatic fluorinated disulfonimide lithium salt and the second lithium salt may be present in the nonaqueous aprotic organic solvent at a concentration in a range of from 0.5 M to 2.0 M.

The acyclic fluorinated ether may account for, by volume, from 5% to 50% of the nonaqueous aprotic organic solvent.

The cyclic carbonate may account for, by volume, from 10% to 40% of the nonaqueous aprotic organic solvent. The acyclic carbonate may account for, by volume, from 60% to 80% of the nonaqueous aprotic organic solvent. The acyclic fluorinated ether, the cyclic carbonate, and the acyclic carbonate may account for, by volume, 100% of the nonaqueous aprotic organic solvent.

The electrolyte may include an anti-corrosion additive of lithium difluoro(oxalate)borate, lithium bis(oxalato)borate, lithium perchlorate, or lithium 2-trifluoromethyl-4,5-dicyanoimidazole. The anti-corrosion additive may account for, by weight, from 0.1% to 5% of the electrolyte.

An electrochemical cell for a lithium metal battery is disclosed. The electrochemical cell includes a negative electrode, a positive electrode spaced apart from the negative electrode, and an electrolyte in ionic contact with the negative and positive electrodes. The negative electrode is made of nonporous lithium metal. The positive electrode includes at least one transition metal oxide that can undergo a reversible intercalation of lithium ions. The electrolyte includes a nonaqueous aprotic organic solvent, a first lithium salt dissolved or ionized in the nonaqueous aprotic organic solvent, and a second lithium salt dissolved or ionized in the nonaqueous aprotic organic solvent. The first lithium salt includes an aliphatic fluorinated disulfonimide lithium salt. The nonaqueous aprotic organic solvent includes a cyclic carbonate, an acyclic carbonate, and an acyclic fluorinated ether.

The negative electrode may include, by weight, greater than 97% lithium.

The first lithium salt may have the formula:

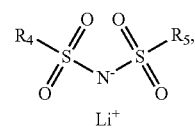

wherein $R_4$ and $R_5$ are individually either a fluorine (F) atom or a straight-chain C1-C6 fluoroalkyl group.

The second lithium salt may include at least one of $LiClO_4$, $LiBF_4$, or $LiPF_6$.

The acyclic fluorinated ether may have the formula:

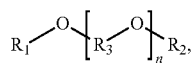

wherein n=0 or 1, wherein $R_1$ and $R_2$ are each straight-chain C1-C6 fluoroalkyl groups, wherein, when n=1, $R_3$ is a methylene group or a polyethylene group, and wherein the total number of carbon atoms in the acyclic fluorinated ether may be 2, 3, 4, 5, 6, or 7.

The cyclic carbonate may be at least one of ethylene carbonate, fluoroethylene carbonate, difluoro ethylene carbonate, or 3,3,3-trifluoropropylene carbonate. The acyclic carbonate may be at least one of diethyl carbonate, dimethyl carbonate, or ethyl methyl carbonate.

A ratio of the first lithium salt to the second lithium salt in the electrolyte may be less than one.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

Illustrative embodiments will hereinafter be described in conjunction with the appended drawings, wherein like designations denote like elements, and wherein:

FIG. 1 is a schematic side cross-sectional view of an electrochemical cell of a secondary lithium metal battery.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

The presently disclosed electrolytes are formulated for use in electrochemical cells of lithium metal batteries to improve the low-temperature operating performance and fast-charging capabilities thereof. To provide the lithium metal batteries with improved low-temperature operating performance and/or resistance to low-temperature operating environments (e.g., temperatures less than −20° C.), the presently disclosed electrolytes are formulated to include a cosolvent in the form of an acyclic fluorinated ether having a relatively low melting point (m.p.), e.g., of less than −40° C. In addition, to provide the lithium metal batteries with improved fast charging performance and/or resistance to fast charging conditions, the presently disclosed electrolytes include a lithium salt including an aliphatic fluorinated disulfonimide anion. Without intending to be bound by theory, it is believed that the fluorinated disulfonimide lithium salt may help improve the fast charging characteristics of lithium metal batteries, for example, by increasing the ionic conductivity of the electrolyte, increasing the diffusivity of lithium ions through the electrolyte near the electrode-electrolyte interface, reducing cell impedance, and also by improving the capacity retention and cycling stability of the electrochemical cells.

FIG. 1 depicts a schematic side cross-sectional view of an electrochemical cell 10 that may be combined with one or more additional electrochemical cells to form a secondary lithium metal battery, such as a lithium metal battery. The electrochemical cell 10 includes a positive electrode 12, a negative electrode 14 spaced apart from the positive electrode 12, an ionically conductive liquid electrolyte 16 that provides a medium for the conduction of lithium ions between the positive electrode 12 and the negative electrode 14, and a porous separator 18 that electrically isolates the positive and negative electrodes 12, 14 from each other while allowing lithium ions to pass therethrough. The positive electrode 12 is disposed on a major surface of a positive electrode current collector 20, and the negative electrode 14 is disposed on a major surface of a negative electrode current collector 22. In practice, the positive and negative electrode current collectors 20, 22 may be electrically coupled to a power source or load 24 via an external circuit 26.

The electrolyte 16 infiltrates the pores of the porous separator 18 and is in physical and ionic contact with the positive and negative electrodes 12, 14. The electrolyte 16 is formulated to facilitate the transport of lithium ions between the positive and negative electrodes 12, 14 over a wide range of operating temperatures (e.g., −30° C. to 60° C.), while also providing the electrochemical cell 10 with exceptional capacity retention, even under fast charging conditions. The electrolyte 16 comprises a nonaqueous aprotic organic solvent, one or more lithium salts dissolved or ionized in the nonaqueous aprotic organic solvent, and optionally an anti-corrosion additive.

The nonaqueous aprotic organic solvent includes a cyclic carbonate, an acyclic carbonate, and a cosolvent of an acyclic fluorinated ether. The composition of the acyclic fluorinated ether of the electrolyte 16 may be represented by the following chemical formula:

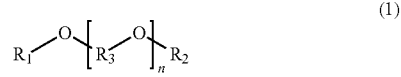

(1)

wherein n=0 or 1. $R_1$ and $R_2$ are each straight-chain C1-C6 fluoroalkyl groups. $R_3$ may be a methylene group ($-CH_2-$) or a polyethylene group (($-CH_2-CH_2-$)$_m$), wherein m=1. The total number of carbon atoms in the acyclic fluorinated ether may be 2, 3, 4, 5, 6, or 7.

In the acyclic fluorinated ether of formula (1), one or both of the straight-chain C1-C6 fluoroalkyl groups may be polyfluoroalkyl groups, wherein at least one hydrogen atom (H), but less than all of the hydrogen atoms, on the carbon chain have been substituted with fluorine atoms (F). In aspects, one or both of the straight-chain C1-C6 fluoroalkyl groups may be perfluoroalkyl groups, wherein all of the hydrogen atoms (H) on the carbon chain have been substituted with fluorine atoms (F). Examples of C1-C6 alkyl groups that may be converted to C1-C6 fluoroalkyl groups by substitution of one or more hydrogen atoms for fluorine atoms include methyl ($-CH_3$), ethyl ($-CH_2CH_3$), propyl (—CH$_2$CH$_2$CH$_3$), butyl (—CH$_2$CH$_2$CH$_2$CH$_3$), pentyl (—CH$_2$CH$_2$CH$_2$CH$_2$CH$_3$), and hexyl (—CH$_2$CH$_2$CH$_2$CH$_2$CH$_2$CH$_3$) groups.

In examples where n=0, R$_1$ may be a straight-chain C1-C6 polyfluoroalkyl group and R$_2$ may be a straight-chain C1-C6 polyfluoroalkyl group. For example, R$_1$ and R$_2$ may be trifluoroethyl groups. In such case, the acyclic fluorinated ether may be bis(2,2,2-trifluoroethyl) ether (CAS No. 333-36-8) and may be represented by the following chemical formula:

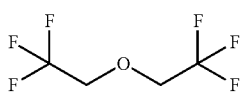

(2)

As another example, R$_1$ may be a tetrafluoropropyl group and R$_2$ may be a tetrafluoroethyl group. In such case, the acyclic fluorinated ether may be 2,2,3,3-tetrafluoro-1-(1,1,2,2-tetrafluoroethoxy)propane (CAS No. 16627-68-2, m.p. −56° C.) and may be represented by the following chemical formula:

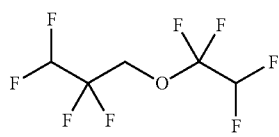

(3)

As another example, R$_1$ may be a trifluoroethyl group and R$_2$ may be a tetrafluoroethyl group. In such case, the acyclic fluorinated ether may be 1,1,2,2-tetrafluoroethyl 2,2,2-trifluoroethyl ether (CAS No. 406-78-0) and may be represented by the following chemical formula:

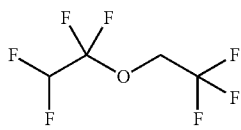

(4)

As another example, R$_1$ may be a difluoroethyl group and R$_2$ may be a tetrafluoroethyl group. In such case, the acyclic fluorinated ether may be 1-(2,2-difluoroethoxy)-1,1,2,2-tetrafluoroethane (CAS No. 50807-77-7) and may be represented by the following chemical formula:

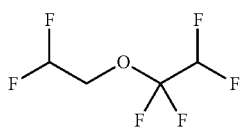

(5)

As another example, R$_1$ may be a trifluoroethyl group and R$_2$ may be a tetrafluoroethyl group. In such case, the acyclic fluorinated ether may be 1,1,2,2-tetrafluoro-1-(2,2,2-trifluoroethoxy)ethane (m.p. −91° C.) and may be represented by the following chemical formula:

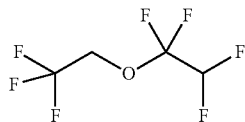

(6)

In examples where n=1, R$_1$ may be a straight-chain C1-C6 polyfluoroalkyl group and R$_2$ may be a straight-chain C1-C6 polyfluoroalkyl group. For example, R$_1$ may be a tetrafluoroethyl group, R$_2$ may be a tetrafluoroethyl group, and R$_3$ may be a polyethylene group. In such case, the acyclic fluorinated ether may be 1,2-bis(1,1,2,2-tetrafluoroethoxy)ethane (f.p. ~45° C.) and may be represented by the following chemical formula:

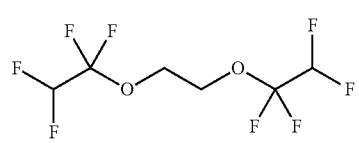

(7)

The acyclic fluorinated ether may exhibit a melting point of less than −20° C., less than −40° C., or less than −50° C. and may provide the electrolyte 16 with a suitably low viscosity, high ionic conductivity at relatively low operating temperatures, and good wettability of the positive and negative electrodes 12, 14. The acyclic fluorinated ether may exhibit a flash point (f.p.) of greater than 0° C., greater than 30° C., greater than 45° C., or greater than 60° C. and may provide the electrolyte 16 with high thermal stability, for example, by reducing the flammability of the electrolyte 16. The acyclic fluorinated ether may account for, by volume, greater than 2%, greater than 5% or greater than 8%, less than 50%, less than 20%, or less than 12%, or from 2% to 50%, from 5% to 25%, or from 8% to 12% of the nonaqueous aprotic organic solvent.

The cyclic carbonate may be selected to facilitate ionization of the lithium salt in the electrolyte 16, as well as formation of a solid electrolyte interphase (SEI) on the surface of the negative electrode 14 at an interface between the negative electrode 14 and the electrolyte 16 during the initial charge of the electrochemical cell 10. The cyclic carbonate may be represented by the following chemical formula:

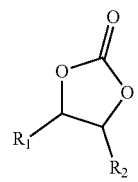

(8)

wherein R$_1$ and R$_2$ are individually hydrogen (H), fluorine (F), or a functional group, for example, an alkyl group, methoxyl group, vinyl group, propargyl group, alkynyl group, benzyl group, hydroxyl group, alkoxy group, alkenoxy group, alkynoxy group, aryloxy group, heterocyclyloxy group, heterocyclyalkoxy group, silyl group, siloxy group, oxo group, carboxyl group, ester group, ether group, cyano group, cyanoalkyl group, polyfluorinated alkyl group, perfluorinated alkyl group, polyfluorinated alkoxy group, or perfluorinated alkoxy group.

In aspects, the cyclic carbonate may comprise at least one of ethylene carbonate (EC), fluoroethylene carbonate (FEC), difluoro ethylene carbonate (DFEC), or 3,3,3-trifluoropropylene carbonate (TFPC). For example, the cyclic carbonate may consist essentially of fluoroethylene carbonate (FEC) having a melting point of less than 25° C. The cyclic carbonate may account for, by volume, greater than 5%, greater than 10%, or greater than 20%, less than 95%, less than 40%, or less than 30%, or from 5% to 95%, from 10% to 40%, or from 20% to 30% of the nonaqueous aprotic organic solvent.

The acyclic carbonate may be selected to facilitate ionization of the lithium salt in the electrolyte 16 and to provide the electrolyte 16 with suitable viscosity at low operating temperatures. The acyclic carbonate may be represented by the following chemical formula:

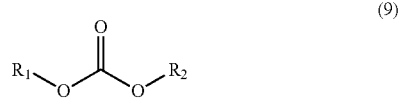

(9)

wherein $R_1$ and $R_2$ are individually hydrogen (H), fluorine (F), or a functional group, for example, an alkyl group, methoxyl group, vinyl group, propargyl group, alkynyl group, benzyl group, hydroxyl group, alkoxy group, alkenoxy group, alkynoxy group, aryloxy group, heterocyclyloxy group, heterocyclyalkoxy group, silyl group, siloxy group, oxo group, carboxyl group, ester group, ether group, cyano group, cyanoalkyl group, polyfluorinated alkyl group, perfluorinated alkyl group, polyfluorinated alkoxy group, or perfluorinated alkoxy group.

In aspects, the acyclic carbonate may comprise diethyl carbonate (DEC, m.p. <45° C., f.p. ~33° C.), dimethyl carbonate (DMC, m.p. <4° C., f.p. ~17° C.), ethyl methyl carbonate (EMC, m.p. <-14° C., f.p. >26° C.), or a combination thereof. For example, the acyclic carbonate may consist essentially of dimethyl carbonate (DMC). The acyclic carbonate may account for, by volume, greater than 50%, greater than 60%, or greater than 65%, less than 95%, less than 80%, or less than 75%, or from 50% to 95%, from 60% to 80%, or from 65% to 75% of the nonaqueous aprotic organic solvent.

At least one of the lithium salts included in the electrolyte 16 is a lithium salt that includes an aliphatic fluorinated disulfonimide anion, which may be referred to herein as a "disulfonimide lithium salt." The disulfonimide lithium salt may be represented by the following chemical formula:

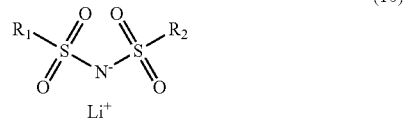

(10)

wherein $R_1$ and $R_2$ are individually either a fluorine (F) atom or a straight-chain C1-C6 fluoroalkyl group. $R_1$ and/or $R_2$ may be a polyfluoroalkyl group, wherein at least one hydrogen atom (H), but less than all of the hydrogen atoms (H), on the carbon chain have been substituted with fluorine atoms (F).

In aspects, one or both of the straight-chain C1-C6 fluoroalkyl groups may be perfluoroalkyl groups, wherein all of the hydrogen atoms (H) on the carbon chain have been substituted with fluorine atoms (F). Examples of C1-C6 alkyl groups that may be converted to C1-C6 fluoroalkyl groups by substitution of one or more hydrogen atoms for fluorine atoms include methyl (—$CH_3$), ethyl (—$CH_2CH_3$), propyl (—$CH_2CH_2CH_3$), butyl (—$CH_2CH_2CH_2CH_3$), pentyl (—$CH_2CH_2CH_2CH_2CH_3$), and hexyl (—$CH_2CH_2CH_2CH_2CH_2CH_3$) groups.

In aspects, $R_1$ and $R_2$ may be a fluorine (F) atom. In such case, the disulfonimide lithium salt may be lithium bis (fluorosulfonyl)imide (LiFSI) (CAS No. 171611-11-3) and may be represented by the following chemical formula:

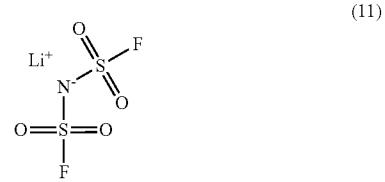

(11)

In aspects, $R_1$ and $R_2$ may be trifluoromethyl groups. In such case, the disulfonimide lithium salt may be lithium bis(trifluoromethanesulfonyl)imide (LiN($CF_3SO_2$)$_2$, LiTFSI) (CAS No. 90076-65-6) and may be represented by the following chemical formula:

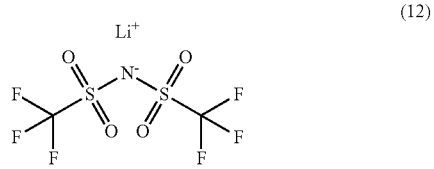 [SMILES: [Li+] ; O=S(=O)([N-]S(=O)(=O)C(F)(F)F)C(F)(F)F]

(12)

In aspects, $R_1$ may be a trifluoromethyl group and $R_2$ may be a fluorine (F) atom. In such case, the disulfonimide lithium salt may be lithium (fluorosulfonyl)(trifluoromethanesulfonyl)imide (CAS No. 192998-62-2) and may be represented by the following chemical formula:

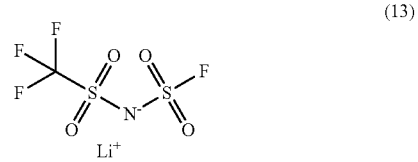 [SMILES: O=S(=O)(F)[N-]S(=O)(=O)C(F)(F)F ; [Li+]]

(13)

The disulfonimide lithium salt may be present in the electrolyte 16 at a concentration of greater than 0.1 M, greater than 0.2 M, or greater than 0.4 M, less than 2.0 M, less than 1.0 M, or less than 0.8 M, or from 0.1 M to 2.0 M, from 0.2 M to 1.0 M, or from 0.4 M to 0.8 M. In aspects, the disulfonimide lithium salt may be present in the electrolyte 16 at a concentration of about 0.6 M.

In addition to the disulfonimide lithium salt, the electrolyte 16 may include one or more of the following lithium salts: $LiClO_4$, $LiAlCl_4$, LiI, LiBr, LiSCN, $LiBF_4$, $LiB(C_6H_5)_4$, $LiAsF_6$, $LiCF_3SO_3$, and/or $LiPF_6$. In aspects, the lithium salts in the electrolyte 16 may consist essentially of the disulfonimide lithium salt and/or at least one of $LiClO_4$, $LiBF_4$, or $LiPF_6$. The overall lithium salt concentration in the electrolyte 16 (including the disulfonimide lithium salt and optional additional lithium salts) may be greater than 0.5 M, greater than 0.8 M, or greater than 1.1 M, less than 2.0 M, less than 1.6 M, or less than 1.3 M, or from 0.5 M to 2.0 M, from 0.8 M to 1.6 M, or from 1.1 M to 1.3 M. In aspects, the overall lithium salt concentration in the electrolyte 16 may be about 1.2 M.

In examples where the electrolyte 16 includes a combination of the disulfonimide lithium salt and an additional second lithium salt (e.g., $LiClO_4$, $LiBF_4$, and/or $LiPF_6$), the amount of the disulfonimide lithium salt in the electrolyte 16 may be less than the amount of the additional second lithium salt in the electrolyte 16. In other words, the ratio of the disulfonimide lithium salt to the second lithium salt in the electrolyte 16 may be less than one.

When present in the electrolyte 16, the anti-corrosion additive may comprise at least one of lithium difluoro (oxalate)borate (LiDFOB), lithium bis(oxalato)borate (LiBOB), lithium perchlorate ($LiClO_4$), or lithium 2-trifluoromethyl-4,5-dicyanoimidazole (LiTDI). When present in the electrolyte 16, the anti-corrosion additive may comprise, by weight, greater than 0.1%, less than 5%, or from 0.1% to 5% of the electrolyte 16.

The porous separator 18 is configured to physically separate the positive electrode 12 and the negative electrode 14 from one another while permitting lithium ions to pass therethrough. The porous separator 18 exhibits an open microporous structure and may comprise an organic and/or inorganic material that can physically separate and electrically insulate the positive and negative electrodes 12, 14 from each other while permitting the free flow of ions therebetween. The porous separator 18 may comprise a non-woven material, e.g., a manufactured sheet, web, or mat of directionally or randomly oriented fibers. The porous separator 18 may comprise a microporous polymeric material, e.g., a microporous polyolefin-based membrane or film. For example, the porous separator 18 may comprise a single polyolefin or a combination of polyolefins, such as polyethylene (PE), polypropylene (PP), polyamide (PA), poly(tetrafluoroethylene) (PTFE), polyvinylidene fluoride (PVdF), and/or poly(vinyl chloride) (PVC). In one form, the porous separator 18 may comprise a laminate of one or more polymeric materials, such as a laminate of PE and PP. The porous separator 18 may have a thickness in a range of from 5 µm to 30 µm and a porosity in a range of from 25% to 75%.

The porous separator 18 may further include one or more of a ceramic coating layer and a heat-resistant material coating. The ceramic coating layer and/or the heat-resistant material coating may be disposed on one or more sides of the porous separator 18. The material forming the ceramic layer may be selected from the group consisting of: alumina ($Al_2O_3$), silica ($SiO_2$), and combinations thereof. The heat-resistant material may be selected from the group consisting of: Nomex®, Aramid, and combinations thereof.

The positive electrode 12 is porous and may comprise one or more electrochemically active materials that can undergo a reversible redox reaction with lithium, e.g., a material that can sufficiently undergo lithium intercalation and deintercalation, alloying and dealloying, or plating and stripping. In one form, the positive electrode 12 may comprise an intercalation host material that can undergo the reversible insertion or intercalation of lithium ions. In such case, the intercalation host material of the positive electrode 12 may comprise a layered oxide represented by the formula $LiMeO_2$, an olivine-type oxide represented by the formula $LiMePO_4$, a spinel-type oxide represented by the formula $LiMe_2O_4$, a tavorite represented by one or both of the following formulas $LiMeSO_4F$ or $LiMePO_4F$, or a combination thereof, where Me is a transition metal (e.g., Co, Ni, Mn, Fe, Al, V, or a combination thereof). In another form, the positive electrode material 12 may comprise a conversion material including a component that can undergo a reversible electrochemical reaction with lithium, in which the component undergoes a phase change or a change in crystalline structure accompanied by a change in oxidation state. In such case, the conversion material of the positive electrode 12 may comprise sulfur, selenium, tellurium, iodine, a halide (e.g., a fluoride or chloride), sulfide, selenide, telluride, iodide, phosphide, nitride, oxide, oxysulfide, oxyfluoride, sulfur-fluoride, sulfur-oxyfluoride, or a lithium and/or metal compound thereof. Examples of suitable metals for inclusion in the conversion material of the positive electrode 12 include iron, manganese, nickel, copper, and cobalt.

In aspects, the positive electrode 12 may include an electrochemically active material in the form of a layered high-nickel content lithium nickel cobalt manganese oxide ($LiNiCoMnO_2$ or NCM). In such case, the nickel (Ni), cobalt (Co), and manganese (Mn) may be present in the electrochemically active material at a ratio of 6-8:1-2:1-2.

The electrochemically active material of the positive electrode 12 may be intermingled with a polymeric binder to provide the positive electrode 12 with structural integrity. Examples of polymeric binders include polyvinylidene fluoride (PVdF), ethylene propylene diene monomer (EPDM) rubber, styrene butadiene rubber (SBR), carboxymethyl cellulose (CMC), polyacrylic acid, and mixtures thereof. The positive electrode 12 optionally may include particles of an electrically conductive material, which may comprise very fine particles of, for example, high-surface area carbon black. The electrochemically active material(s) may account for, by weight, from 50% to 90% of the positive electrode 12, the polymeric binder may account for, by weight, from 5% to 30% of the positive electrode 12, and the electrically conductive material may account for, by weight, 5% to 40% of the positive electrode 12.

The negative electrode 14 may be in the form of a nonporous layer of lithium metal. In such case, the negative electrode 14 may comprise a lithium metal alloy or may consist essentially of lithium (Li) metal. For example, the negative electrode 14 may comprise, by weight, greater than 97% lithium or greater than 99% lithium. As such, in aspects, the negative electrode 14 does not comprise other elements or compounds that undergo a reversible redox reaction with lithium during operation of the electrochemical cell 10. For example, in aspects, the negative electrode 14 does not comprise an intercalation host material that is formulated to undergo the reversible insertion or intercalation of lithium ions or an alloying material that can electrochemically alloy and form compound phases with lithium. In addition, in aspects, the negative electrode 14 does not comprise a conversion material or an alloy material that can electrochemically alloy and form compound phases with lithium. Examples of materials that may be excluded from the negative electrode 14 of the present disclosure include carbon-based materials (e.g., graphite, activated carbon, carbon black, and graphene), silicon and silicon-based materials, tin oxide, aluminum, indium, zinc, cadmium, lead, germanium, tin, antimony, titanium oxide, lithium titanium oxide, lithium titanate, lithium oxide, metal oxides (e.g., iron oxide, cobalt oxide, manganese oxide, copper oxide, nickel oxide, chromium oxide, ruthenium oxide, and/or molybdenum oxide), metal phosphides, metal sulfides, and metal nitrides (e.g., phosphides, sulfides, and/or nitrides or iron, manganese, nickel, copper, and/or cobalt). In aspects, the negative electrode 14 does not comprise a polymeric binder. Examples of polymeric binders that may be excluded from the negative electrode 14 of the present disclosure include polyvinylidene fluoride (PVdF), ethylene propylene diene monomer (EPDM) rubber, styrene butadiene rubber (SBR), carboxymethyl cellulose (CMC), and polyacrylic acid. The negative electrode 14 may have a thickness in a range of from 5 micrometers to 600 micrometers.

The positive and negative electrode current collectors 20, 22 may be in the form of thin and flexible porous or non-porous electrically conductive metallic substrates and may comprise a metallic material that is capable of collecting and reversibly passing free electrons to and from their respective electrodes 12, 14. The term "metallic," as used herein refers to a material that predominantly comprises one or more metals. As such, a metallic material may comprise a single metal, more than one metal (in alloy form or otherwise), or both one or more metals and one or more other non-metal components in elemental or compound form. For example, the positive and negative electrode current collectors 20, 22 may comprise an electrically conductive metal or metal alloy, e.g., a transition metal or an alloy thereof. In aspects, the positive electrode current collector 20 may comprise aluminum (Al), nickel (Ni), or an iron (Fe) alloy (e.g., stainless steel) and the negative electrode current collector 22 may comprise copper (Cu), nickel (Ni), an iron (Fe) alloy (e.g., stainless steel), or titanium (Ti). Other electrically conductive metals may of course be used, if desired.

These and other benefits will be readily appreciated by those of ordinary skill in the art in view of the forgoing disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:
1. An electrolyte for a lithium metal battery, the electrolyte comprising:
    a nonaqueous aprotic organic solvent; and
    a lithium salt dissolved or ionized in the nonaqueous aprotic organic solvent,
    wherein the nonaqueous aprotic organic solvent includes a cyclic carbonate, an acyclic carbonate, and an acyclic fluorinated ether having the formula:

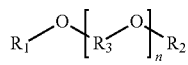

wherein n=0 or 1,
    wherein $R_1$ and $R_2$ are each straight-chain C1-C6 fluoroalkyl groups,
    wherein, when n=1, $R_3$ is a methylene group or a polyethylene group, and
    wherein the lithium salt comprises lithium (fluorosulfonyl)(trifluoromethanesulfonyl)imide.
2. The electrolyte of claim 1 wherein the total number of carbon atoms in the acyclic fluorinated ether is 2, 3, 4, 5, 6, or 7.
3. The electrolyte of claim 1 wherein n=0, wherein $R_1$ is a perfluoromethyl group or a perfluoroethyl group, and wherein $R_2$ is a perfluoromethyl group or a perfluoroethyl group.
4. The electrolyte of claim 1 wherein n=1, $R_1$ and $R_2$ are each perfluoroethyl groups, and $R_3$ is an ethylene group.
5. The electrolyte of claim 1 wherein the acyclic fluorinated ether is at least one of bis(2,2,2-trifluoroethyl) ether, 2,2,3,3-tetrafluoro-1-(1,1,2,2-tetrafluoroethoxy)propane, 1,1,2,2-tetrafluoroethyl 2,2,2-trifluoroethyl ether, 1-(2,2-difluoroethoxy)-1,1,2,2-tetrafluoroethane, 1,1,2,2-tetrafluoro-1-(2,2,2-trifluoroethoxy)ethane, or 1,2-bis(1,1,2,2-tetrafluoroethoxy)ethane, and wherein the acyclic fluorinated ether accounts for, by volume, from 5% to 50% of the nonaqueous aprotic organic solvent.
6. The electrolyte of claim 1 wherein the cyclic carbonate is at least one of ethylene carbonate, fluoroethylene carbonate, difluoro ethylene carbonate, or 3,3,3-trifluoropropylene carbonate, and wherein the acyclic carbonate is at least one of diethyl carbonate, dimethyl carbonate, or ethyl methyl carbonate.
7. The electrolyte of claim 1 wherein the lithium (fluorosulfonyl)(trifluoromethanesulfonyl)imide is present in the nonaqueous aprotic organic solvent at a concentration in a range of from 0.1 M to 1.0 M.
8. The electrolyte of claim 1 further comprising a second lithium salt dissolved or ionized in the nonaqueous aprotic organic solvent, wherein the second lithium salt comprises at least one of $LiClO_4$, $LiBF_4$, or $LiPF_6$, and wherein, in combination, the lithium (fluorosulfonyl)(trifluoromethanesulfonyl)imide and the second lithium salt are present in the nonaqueous aprotic organic solvent at a concentration in a range of from 0.5 M to 2.0 M.
9. The electrolyte of claim 5 wherein the cyclic carbonate accounts for, by volume, from 10% to 40% of the nonaqueous aprotic organic solvent, the acyclic carbonate accounts for, by volume, from 60% to 80% of the nonaqueous aprotic organic solvent, and wherein the acyclic fluorinated ether, the cyclic carbonate, and the acyclic carbonate account for, by volume, 100% of the nonaqueous aprotic organic solvent.
10. The electrolyte of claim 1 further comprising an anti-corrosion additive of lithium difluoro(oxalate)borate, lithium bis(oxalato)borate, lithium perchlorate, or lithium 2-trifluoromethyl-4,5-dicyanoimidazole, wherein the anti-corrosion additive accounts for, by weight, from 0.1% to 5% of the electrolyte.
11. An electrochemical cell comprising:
    a negative electrode made of nonporous lithium metal;
    a positive electrode spaced apart from the negative electrode, the positive electrode including at least one transition metal oxide that can undergo a reversible intercalation of lithium ions; and
    an electrolyte in ionic contact with the negative and positive electrodes, the electrolyte including:
    a nonaqueous aprotic organic solvent;
    a first lithium salt dissolved or ionized in the nonaqueous aprotic organic solvent, the first lithium salt including an aliphatic fluorinated disulfonimide lithium salt; and
    a second lithium salt dissolved or ionized in the nonaqueous aprotic organic solvent;

wherein the nonaqueous aprotic organic solvent includes a cyclic carbonate, an acyclic carbonate, and an acyclic fluorinated ether, and wherein the aliphatic fluorinated disulfonimide lithium salt comprises lithium (fluorosulfonyl)(trifluoromethanesulfonyl)imide.

12. The electrochemical cell of claim 11 wherein the negative electrode comprises, by weight, greater than 97% lithium.

13. The electrochemical cell of claim 11 wherein the second lithium salt comprises at least one of $LiClO_4$, $LiBF_4$, or $LiPF_6$, and wherein a ratio of the first lithium salt to the second lithium salt in the electrolyte is less than one.

14. The electrochemical cell of claim 11 wherein the acyclic fluorinated ether has the formula:

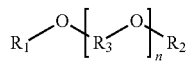

wherein n=0 or 1, wherein $R_1$ and $R_2$ are each straight-chain C1-C6 fluoroalkyl groups, wherein, when n=1, $R_3$ is a methylene group or a polyethylene group, and wherein the total number of carbon atoms in the acyclic fluorinated ether is 2, 3, 4, 5, 6, or 7.

15. The electrochemical cell of claim 11 wherein the cyclic carbonate is at least one of ethylene carbonate, fluoroethylene carbonate, difluoro ethylene carbonate, or 3,3,3-trifluoropropylene carbonate, and wherein the acyclic carbonate is at least one of diethyl carbonate, dimethyl carbonate, or ethyl methyl carbonate.

16. The electrochemical cell of claim 15 wherein the acyclic fluorinated ether is at least one of bis(2,2,2-trifluoroethyl) ether, 2,2,3,3-tetrafluoro-1-(1,1,2,2-tetrafluoroethoxy)propane, 1,1,2,2-tetrafluoroethyl 2,2,2-trifluoroethyl ether, 1-(2,2-difluoroethoxy)-1,1,2,2-tetrafluoroethane, 1,1,2,2-tetrafluoro-1-(2,2,2-trifluoroethoxy)ethane, or 1,2-bis(1,1,2,2-tetrafluoroethoxy)ethane, and wherein the acyclic fluorinated ether accounts for, by volume, from 5% to 50% of the nonaqueous aprotic organic solvent.

17. The electrochemical cell of claim 16 wherein the cyclic carbonate accounts for, by volume, from 10% to 40% of the nonaqueous aprotic organic solvent, the acyclic carbonate accounts for, by volume, from 60% to 80% of the nonaqueous aprotic organic solvent, and wherein the acyclic fluorinated ether, the cyclic carbonate, and the acyclic carbonate account for, by volume, 100% of the nonaqueous aprotic organic solvent.

18. The electrochemical cell of claim 11 wherein the electrolyte in ionic contact with the negative and positive electrodes consists of the nonaqueous aprotic organic solvent, the first lithium salt, the second lithium salt, and optionally an anti-corrosion additive, and wherein the nonaqueous aprotic organic solvent consists of the cyclic carbonate, the acyclic carbonate, and the acyclic fluorinated ether.

* * * * *